(12) United States Patent
Weirauch

(10) Patent No.: US 7,283,455 B2
(45) Date of Patent: Oct. 16, 2007

(54) DATA MEDIA HAVING VARIABLE CONTROL FIELD IN DATA UNITS

(75) Inventor: Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 547 days.

(21) Appl. No.: 10/632,575

(22) Filed: Jul. 31, 2003

(65) Prior Publication Data

US 2005/0025037 A1     Feb. 3, 2005

(51) Int. Cl.
*G11B 7/00* (2006.01)

(52) U.S. Cl. .................................. 369/275.3

(58) Field of Classification Search .............. 369/275.3, 369/47.28, 47.27, 275.2, 44.13, 53.14, 44.26, 369/47.1
See application file for complete search history.

(56) References Cited

U.S. PATENT DOCUMENTS

| | | | |
|---|---|---|---|
| 4,389,681 A * | 6/1983 | Tanaka et al. | ................. 360/27 |
| 5,233,576 A | 8/1993 | Curtis et al. | |
| 6,330,210 B1 | 12/2001 | Weirauch et al. | |
| 7,082,092 B2 * | 7/2006 | Weijenbergh et al. | ... 369/59.25 |

* cited by examiner

*Primary Examiner*—Nabil Hindi

(57) ABSTRACT

Data units on a data storage medium include a control field. In one example embodiment, a control block specifies the control action determined by the state of one or more bits in the control field. By using a control block to specify the action of one or more bits in the control field, the action controlled by the data in the control field can be changed to accommodate future needs.

19 Claims, 3 Drawing Sheets

100

102

110

DATA MEDIA HAVING VARIABLE CONTROL FIELD IN DATA UNITS

FIELD OF INVENTION

This invention relates generally to data storage media.

BACKGROUND

U.S. Pat. No. 6,330,210 (Weirauch et al.) teaches a data structure (called a disk control block (DCB), on a rewriteable data storage medium, that among other things is used to control access for specific regions on the medium. For example, an access control block may divide a medium into regions, and the control block may specify for each region whether the drive has no access restrictions for the region, or whether the drive is permitted, in a region, to write, to format, to write-once, to read with password, to write with password, to format with password, to append with password, and so forth. Control blocks may be used for more than access control. U.S. Pat. No. 6,330,210 is hereby incorporated by reference for all that it teaches.

In general, a control block does not need to specify all control of regions at format time. New regions may be written, and a control block may be updated, or a new control block may be defined to specify control for the new regions. This creates two problems. First, performance may be reduced if a control block must be accessed and rewritten every time a new region is written. Second, for some types of rewriteable media, there is a limit on the number of times an area can be overwritten, and for some types of rewriteable media, repeatedly rewriting the same data in the same area can reduce the number of times the area can be rewritten. For example, for many types of data storage media, the smallest unit that can be read is commonly called a sector. For some media, each medium can hold on the order of 10 million sectors. If separate access control needs to be specified for each sector, the control block may need to be updated 10 million times if the medium is written completely. There is a need for improved control for data storage media.

SUMMARY

Data units on a data storage medium include a control field. In one example embodiment, a control block specifies the control action determined by the state of one or more bits in the control field.

DETAILED DESCRIPTION

Data units include a control field. In one example embodiment, a control block, on the same medium as a data unit, specifies the control action for one or more bits in the control field. When the data unit is written, one or more bits in the control field are written with an appropriate value consistent with control specified by the control block. When the data unit is read, one or more bits in the control field are used for control for the data unit, as specified by the control block. As a result, the control block may only need to be written once, and the control field is written as part of each data unit without having to update or rewrite the control block.

A drive that recognizes the control block ID must conform to the control action defined by the state of one or more bits in the control field. A drive that does not recognize the control block ID must conform to control action specified in an Unknown Content Descriptor Actions (UCDA) field in the control block. By using a control block to specify the action of one or more bits in the control field, the action controlled by the data in the control field can be changed to accommodate future needs. By using a control block with a UCDA, the behavior of a legacy drive will not be inconsistent with the requirements of future new control blocks.

The control block may also specify which data units are controlled by the control block. That is, the control block may control every data unit on the medium, or just a region specified by the control block.

One example of a data unit is the smallest unit that can be read, which for many media is called a sector. It is common to logically group multiple sectors together for error correction, with the resulting group called an error correction block. An error correction block is another example of a data unit. Still Another example is a track. Still other examples include regions defined by control blocks. That is, control blocks may define regions, and may define one or more bits within a control field in those regions.

Figure 1A:
FIGS. 1A, 1B, and 1C are block diagrams illustrating examples of data on a data storage medium.
Figure 1B:
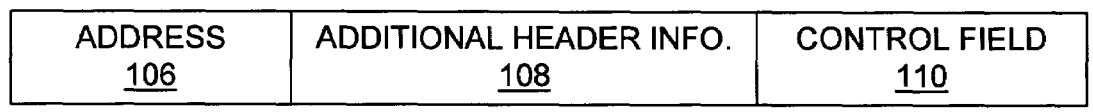
Figure 1C:
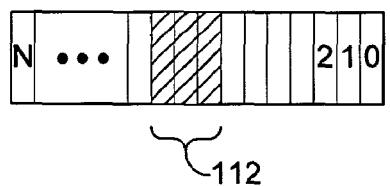

FIG. 1A illustrates an example data unit 100, having a header 102 and a data area 104. FIG. 1B illustrates an example of additional detail for the header 102. In FIG. 1B, the header 102 includes an address 106, additional header information 108, and a control field 110. The order of 102, 104 and 106 is not important. In FIG. 1C, control field 110 comprises multiple bits numbered 0-N. A subset 112 of the bits (designated by crosshatching) is specified by a control block.

Figure 2:
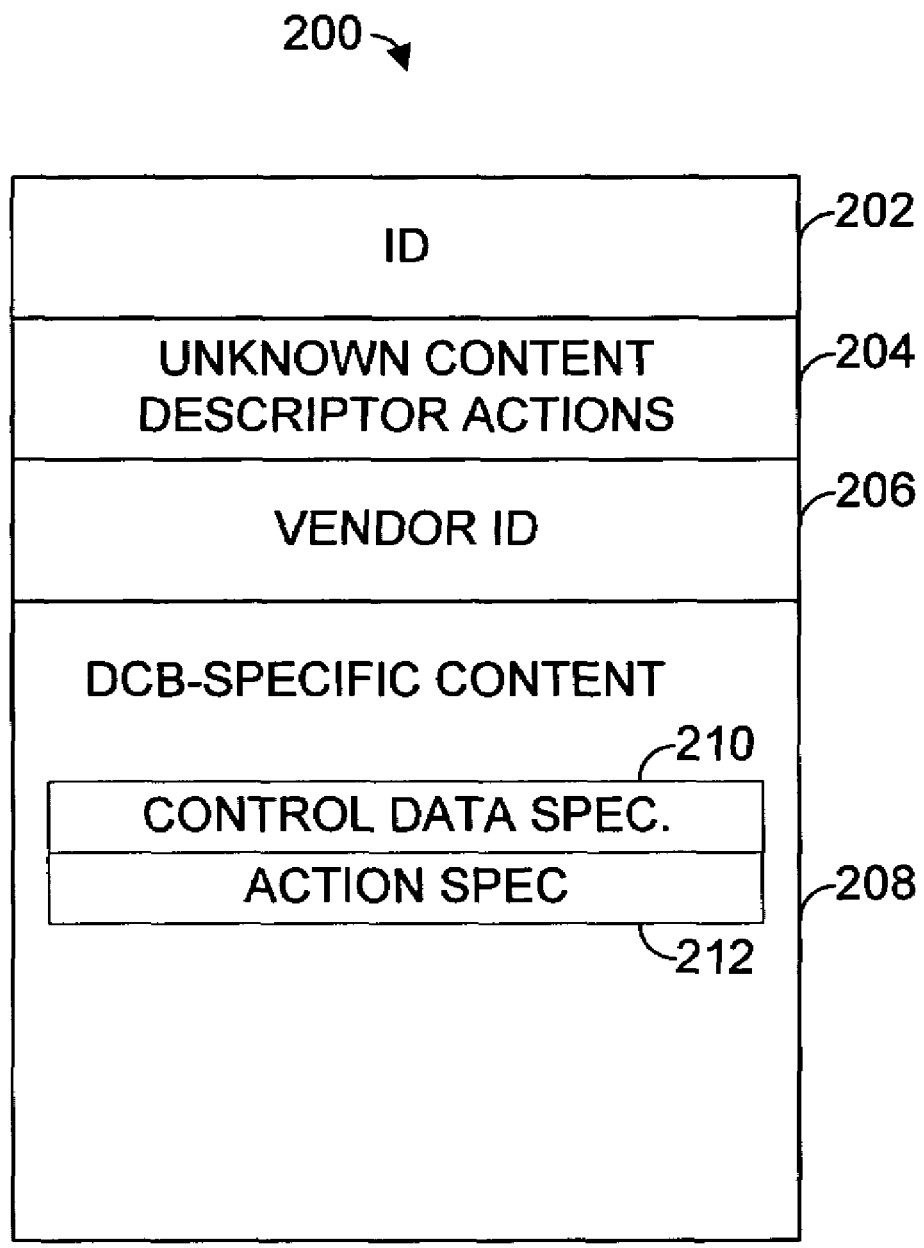
FIG. 2 is a block diagram of an example of a control block on a data storage medium.

FIG. 2 illustrates an example disk control block 200. The block includes a control block ID 202, a UCDA field 204, a vendor ID 206, and a DCB-specific content area 208, all of which are specified to be present for all standard disk control blocks. Within the DCB-specific content area 208, a control data specification area 210 specifies bits within the control field of a data unit (FIG. 1C, 112). In addition, an action specification area 212 specifies actions that the specified data controls. The DCB-specific content area 208 may also specify which data units the control block controls. Areas 210 and 212 are depicted as separate areas to illustrate two separate functions, but the areas may be physically combined as one data structure.

Control data specification 210 may, for example, identify bits 112 (FIG. 1C) as the control bits that are specified by control block 200. For the example of three specified bits in FIG. 1C, action specification 212 may, for example, specify an action controlled independently by each of the bits. Alternatively, action specification 212 may, for example, specify a control action for each of the eight possible states for three bits.

For example, the DCB for a data unit may specify that the data unit is password protected, and for one of the specified control bits (FIG. 1C, 112), if the control bit is a logical ONE, then the data must not be sent from the drive to a requesting device unless a valid password has been received from the protecting device. Likewise, the DCB may specify that if the control bit is a logical ZERO, then the data can be sent from the drive to the requesting device even if no password has been provided.

Alternatively, for example, one bit might specify password control as discussed above, and a second bit might specify encryption control. A combination of two bits can specify four different control actions. For example, the DCB may specify control for two bits as follows:

| BIT1 | BIT0 | ACTION REQUIRED BY DRIVE |
|------|------|--------------------------|
| 0 | 0 | Send unencrypted data to requesting device, regardless of password validity. |
| 0 | 1 | Send unencrypted data to requesting device only if valid password received. |
| 1 | 0 | Send encrypted data to requesting device, regardless of password validity. |
| 1 | 1 | Send encrypted data to requesting device only if valid password received. |

Figure 3:
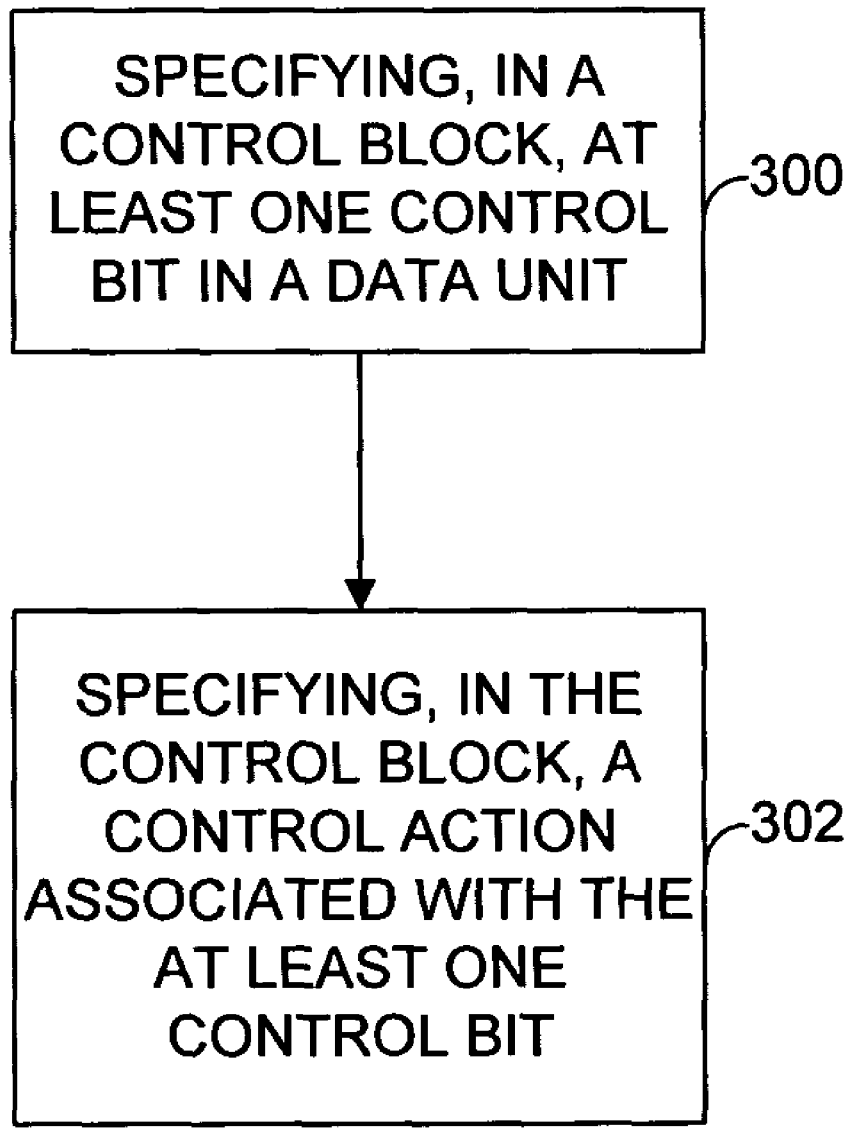
FIG. 3 is a flow chart of an example method.

FIG. 3 illustrates an example method. At step 300, a control block specifies at least one control bit in a data unit. At step 302, the control block specifies a control action associated with the at least one control bit.

In an alternative embodiment, control action for the control bits is specified in drive firmware instead of in a control block on the medium. That is, drive firmware includes the functional equivalent of the action specification (212) of FIG. 2.

What is claimed is:

1. A data storage medium, comprising:
   a data unit;
   a control field within the data unit; and
   a control block, separate from the data unit,
   wherein the control block comprises an identifier, a first control area for use if the identifier is recognized, and a second control area for use if the identifier is not recognized;
   wherein the control field comprises at least one bit having a control action specified by the first control area.

2. The data storage medium of claim 1, where the data unit is one of: a sector, an error correction block, and a track.

3. A data storage medium, comprising:
   a control block having an identifier, a first control field for use if the identifier is recognized, and a second control field for use if the identifier is not recognized; and
   a data unit, separate from the control block,
   wherein the first control field specifies at least one control bit in the data unit and specifies a control action associated with the at least one control bit.

4. The data storage medium of claim 3, where the data unit is one of: a sector, an error correction block, and a track.

5. A data storage medium, comprising:
   a control block having an identifier, a first control area for use if the identifier is recognized, and a second control area for use if the identifier is not recognized;
   a data unit, separate from the control block; and
   a control field within the data unit,
   wherein at least one bit of the control field is specified by the first control area;
   wherein a control action associated with the at least one bit of the control field is specified by firmware in a drive reading the data storage medium.

6. The data storage medium of claim 5, where the data unit is one of: a sector, an error correction block, and a track.

7. A method, comprising:
   providing, in a control block of a data storage medium, an identifier, a first control field for use if the identifier is recognized, and a second control field for use if the identifier is not recognized;
   specifying, in the first control field of the control block, at least one control bit in a data unit stored on the data storage medium, the data unit separate from the control block; and
   specifying, in the first control field of the control block, a control action associated with the at least one control bit.

8. A method for reading a data storage medium, comprising:
   reading a control block of the data storage medium, the control block having an identifier, a first control field for use if the identifier is recognized, and a second control field for use if the identifier is not recognized;
   reading an area of the first control field that specifies at least one control bit in a data unit stored in the data storage medium, the data unit separate from the control block;
   reading an area of the first control field that specifies a control action associated with the at least one control bit;
   reading the at least one control bit in the data unit; and
   conforming to the control action associated with the at least one control bit.

9. The data storage medium of claim 1, wherein the control block is written once and wherein the data unit is re-writable.

10. The data storage medium of claim 1, wherein the at least one bit is set such that the control action applies to the data unit.

11. The data storage medium of claim 1, wherein the at least one bit is set such that the control action does not apply to the data unit.

12. The data storage medium of claim 1 further comprising a plurality of data units, wherein the control block specifies which data units are controlled by the control block.

13. The data storage medium of claim 1 wherein the control action corresponds to password control.

14. The data storage medium of claim 13 wherein the at least one bit is set to enable data associated with the data unit to be sent to a requesting device if a valid password is provided.

15. The data storage medium of claim 13 wherein the at least one bit is set to enable data associated with the data unit to be sent to a requesting device without a valid password being provided.

16. The data storage medium of claim 1 wherein the control action corresponds to encryption control.

17. The data storage medium of claim 16 wherein the at least one bit is set to enable encrypted data associated with the data unit to be sent to a requesting device.

18. The data storage medium of claim 16 wherein the at least one bit is set to enable decrypted data associated with the data unit to be sent to a requesting device.

19. The data storage medium of claim 1 wherein the control action corresponds to a combination of password control and encryption control.

\* \* \* \* \*